US006931921B2

United States Patent
Shimura

(10) Patent No.: US 6,931,921 B2
(45) Date of Patent: Aug. 23, 2005

(54) TIRE AIR PRESSURE MONITORING DEVICE AND PNEUMATIC TIRE HAVING THE TIRE AIR PRESSURE MONITORING DEVICE

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 19 days.

(21) Appl. No.: 10/649,803

(22) Filed: Aug. 28, 2003

(65) Prior Publication Data

US 2004/0040376 A1 Mar. 4, 2004

(30) Foreign Application Priority Data

Aug. 28, 2002 (JP) ........................................ 2002-248609

(51) Int. Cl.$^7$ ............................................ G01M 17/02
(52) U.S. Cl. ........................................................ 73/146
(58) Field of Search ............................... 73/146, 146.2, 73/146.3, 146.4, 146.5, 146.8; 340/440, 442, 444, 445, 446

(56) References Cited

U.S. PATENT DOCUMENTS

| | | | | |
|---|---|---|---|---|
| 4,186,377 A | * | 1/1980 | Barabino | 340/446 |
| 6,175,301 B1 | * | 1/2001 | Piesinger | 340/442 |
| 6,529,838 B1 | * | 3/2003 | Horiuchi et al. | 702/41 |
| 6,630,885 B2 | * | 10/2003 | Hardman et al. | 340/505 |
| 6,880,394 B2 | * | 4/2005 | Boulot | 73/146 |
| 2003/0233872 A1 | * | 12/2003 | Boulot | 73/146 |

* cited by examiner

*Primary Examiner*—William Oen
*Assistant Examiner*—Andre Allen
(74) *Attorney, Agent, or Firm*—Rader, Fishman & Grauer PLLC

(57) ABSTRACT

A tire air pressure monitoring device includes a sensor which detects a physical quantity relating to tire air pressure, and a transmitter which sends signals detected by the sensor. The sensor is a sound pressure level sensor which detects a sound pressure level inside a tire cavity filled with air. The transmitter is enabled to send the signals only when the sound pressure level detected by the sound pressure level sensor is changed.

8 Claims, 1 Drawing Sheet

TIRE AIR PRESSURE MONITORING DEVICE AND PNEUMATIC TIRE HAVING THE TIRE AIR PRESSURE MONITORING DEVICE

BACKGROUND OF THE INVENTION

The present invention relates to a tire air pressure monitoring device and a pneumatic tire having a tire air pressure monitoring device. More specifically, the present invention relates to a tire air pressure monitoring device which can save power consumption and a pneumatic tire having the tire air pressure monitoring device attached thereon.

Tire air pressure monitoring devices are generally configured to detect physical quantities such as air pressure or temperature inside a tire cavity filled with air by a sensor and to send the detected signals to a vehicle side by a transmitter. Tire air pressure monitoring devices of this kind are attached inside a tire cavity. Thus, a battery is usually used as a power source for the monitoring device.

However, the above tire air pressure monitoring devices constantly transmit detected information to a vehicle side by a transmitter, and the maximum electric power is consumed during the transmission. Accordingly, a battery is drained quickly and required to be replaced frequently.

To counteract this problem, a tire air pressure monitoring device has been proposed, in which a transmitter is switched between a transmission mode and a stop mode by a centrifugal switch. As a vehicle starts to drive, tires rotate, centrifugal force acts on the centrifugal switch, and the centrifugal switch is turned on. Accordingly, the transmitter is switched to the transmission mode. When the vehicle is not driving, centrifugal force does not act on the centrifugal switch. Thus, the centrifugal switch is off, and the transmitter is switched to the stop mode. Therefore, power consumption is saved because of turning the transmitter to the transmission mode only when the vehicle is driving.

However, the centrifugal switch does not work unless a predetermined degree of centrifugal force or more acts on the switch. In other words, the centrifugal switch does not work until the traveling speed of the vehicle reaches approximately 8 km/h or more. Thus, tire air pressure cannot be monitored from starting of driving a vehicle to the traveling speed thereof which reaches that speed. To secure traveling safety of a vehicle, it is preferable to notify a driver of the tire air pressure information immediately after a vehicle starts to drive, at the latest. However, there is a disadvantage that the notification can not be done.

As another solution, there has been proposed a tire air pressure monitoring device which saves power consumption by using a vibration sensor to switch a transmitter between a transmission mode and a stop mode. Since this device determines whether the vehicle is driving by vibration of a vibration piece inside the vibration sensor, the device is able to notify a driver of the tire air pressure information immediately after the vehicle starts to drive. However, when a vehicle reaches a certain degree of traveling speed, a large centrifugal force acts on the vibration sensor. Consequently, the centrifugal force pressures the vibration piece in a direction where the centrifugal force is acting, and the vibration piece becomes incapable of vibrating. As a result, a driver cannot be notified of the tire air pressure information.

SUMMARY OF THE INVENTION

An object of the present invention is to provide a tire air pressure monitoring device and a pneumatic tire having the monitoring device, in which during traveling tire air pressure information detected by a sensor can be reliably sent to a vehicle side with saving of power consumption.

In order to achieve the foregoing object, a tire air pressure monitoring device according to the present invention includes a sensor which detects a physical quantity relating to tire air pressure, and a transmitter which sends signals detected by the sensor, the sensor being a sound pressure level sensor which detects a sound pressure level inside a tire cavity filled with air, and the transmitter being enabled to send the signals only when the sound pressure level detected by the sound pressure level sensor is changed.

A pneumatic tire according to the present invention has the tire air pressure monitoring device described above inside a cavity of the tire.

According to the tire air pressure monitoring device of the present invention, the transmitter does not send signals during stopping of a vehicle, since the sound pressure level does not change inside the tire cavity. Accordingly, power consumption can be reduced during that period. On the other hand, the transmitter sends signals during traveling of a vehicle, because the sound pressure level inside the tire cavity changes. Therefore, the tire air pressure information can be securely sent to a vehicle side during traveling.

DETAILED DESCRIPTION OF THE PREFERRED EMBODIMENTS

The embodiments of the present invention will be described in detail below with reference to the attached drawings.

Figure 1:
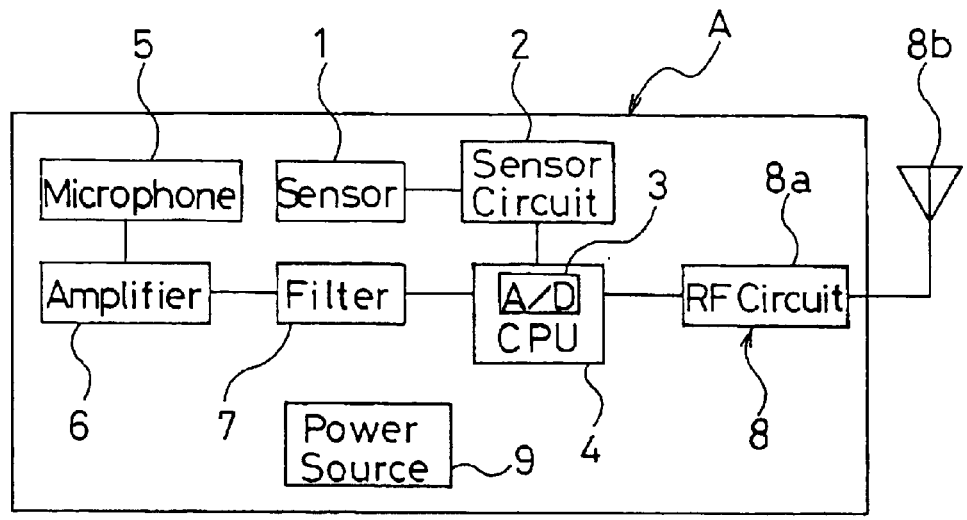
FIG. 1 is a circuit block diagram showing an embodiment a tire air pressure monitoring device according to the present invention.

FIG. 1 shows an embodiment of a tire air pressure monitoring device according the present invention. The tire air pressure monitoring device A comprises a sensor 1 which detects a physical quantity relating to tire air pressure. The sensor 1 is connected through a sensor circuit 2 to a central processing unit (CPU) 4 incorporating an analog to digital (A/D) converter 3. The physical quantity relating to tire air pressure detected by the sensor 1 may preferably include air pressure and temperature inside a tire cavity.

A microphone (sound pressure level sensor) 5 for detecting a sound pressure level inside the tire cavity filled with air is connected through an amplifier 6 to a filter (band pass filter) 7. The filter 7 allows only a predetermined frequency band around resonance in the tire cavity to pass through. For example, the filter 7 allows a frequency band of around 250 Hz to pass through when employed in passenger cars, and allows a frequency band of around 150 Hz to pass through when employed in heavy loading vehicles such as tracks and buses. The filter 7 is connected to the CPU 4 through the A/D converter 3. A transmitter 8 comprising a radio frequency (RF) circuit 8a and an antenna 8b is connected to the CPU 4. This transmitter 8 sends signals detected by the sensor 1, that is, tire air pressure information to a vehicle side.

The CPU 4 determines whether values of the sound pressure level signals detected by the microphone 5 are changing around a preset threshold value corresponding to the resonance inside the tire cavity. When the values are determined to be changing, the CPU 4 switches the transmitter 8 to a transmission mode. In other cases, the transmitter 8 is set to a transmission stop mode. Only when the sound pressure level is appropriately changed, the signals detected by the sensor 1 can be sent to the vehicle side by the transmitter 8. In the drawing shown, reference numeral 9 is a power source for activating the tire air pressure monitoring device A, and a battery is used for the power source.

Figure 2:
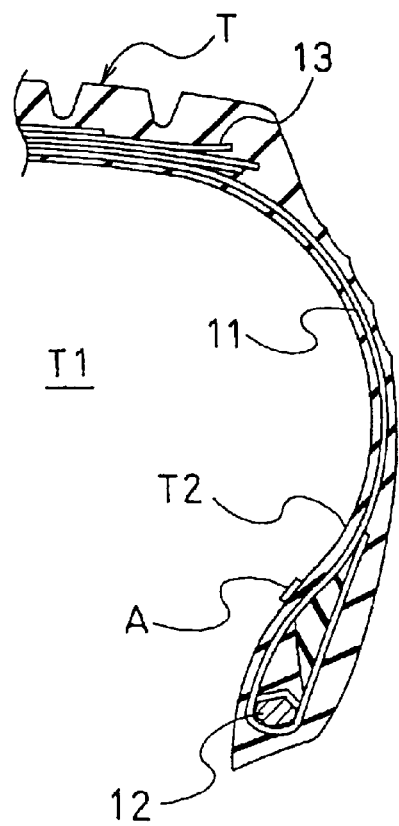
FIG. 2 is a cross sectional view showing a main part of an embodiment of a pneumatic tire in a state where the tire air pressure monitoring device of FIG. 1 is attached thereto.

FIG. 2 shows a state where the tire air pressure monitoring device A is arranged inside a tire cavity T1 of a pneumatic tire T. In the drawing shown, reference numeral 11 denotes a carcass layer which is provided between bead cores 12 embedded in bilateral bead portions, and reference numeral 13 denotes a belt layer disposed on the outer circumferential side of the carcass layer 11 in a tread portion.

In FIG. 2, an example of a pneumatic tire having the tire air pressure monitoring device A which is fixed to a tire inner surface T2 facing the tire cavity T1 is shown. However, the tire air pressure monitoring device A can be attached by a fixing band to a rim which is fitted to the pneumatic tire T, instead. Moreover, the sensor 1 and the microphone 5 can be arranged to be exposed on the tire inner surface T2, and other parts can be embedded in the pneumatic tire T. Such arrangement is also regarded as the attachment inside the tire cavity T1 of the pneumatic tire T in the present invention.

According to the foregoing tire air pressure monitoring device, the sensor 1 constantly detects a physical quantity relating to tire air pressure. The physical quantity is converted into signals suitable for transmission in the sensor circuit 2. Thereafter, the signals are sent to the CPU 4. When the vehicle is driving, the resonance is not generated in the tire cavity. Thus, the sound pressure level is not changed. Therefore, the sound pressure level signals detected by the microphone 5 and sent to the CPU 4 through the amplifier 6 and the filter 7, does not change around the preset threshold. Consequently, the transmitter 8 is maintained in the transmission stop mode by the CPU 4, and the tire air pressure information is not sent to the vehicle side from the transmitter 8.

On the other hand, when the vehicle is driving, the resonance is generated in the tire cavity. As a result, the sound pressure level constantly changes. The sound pressure level signals detected by the microphone 5 change around the preset threshold. Hence, the CPU 4 switches the transmitter 8 to the transmission mode, and the tire air pressure information is always sent to the vehicle while the vehicle is driving.

Therefore, when the vehicle is not driving, the transmitter 8 does not send signals. Thus, the power consumption can be saved. Meanwhile, the transmitter 8 switched to the transmission mode can securely send the information detected by the sensor 1 to the vehicle side during vehicle traveling.

In the foregoing embodiment of the present invention, the transmitter 8 is switched to the transmission mode by use of the microphone 5, the amplifier 6, the filter 7 and the CPU 4, and the transmitter 8 is operated only when the vehicles is driving. However, as a matter of course, the constitution of the present invention is not limited thereto as long as the transmitter 8 is enabled to send signals by utilizing the changes of the sound pressure level in the tire cavity T1.

Having thus explained, the present invention enables a transmitter to send signals by using changes of a sound pressure level detected by a sound pressure level sensor which detects the sound pressure level inside a tire cavity filled with air. Thus, it is possible to save the power consumption by stopping the transmitter when the vehicle is not driving. Meanwhile, it is possible to securely send the tire air pressure information detected by the sensor to the vehicle side when the vehicle is driving.

What is claimed is:

1. A tire air pressure monitoring device having a sensor which detects a physical quantity relating to tire air pressure, and a transmitter which sends signals detected by the sensor, wherein the sensor is a sound pressure level sensor which detects a sound pressure level inside a tire cavity filled with air, the transmitter being enabled to send the signals only when the sound pressure level detected by the sound pressure level sensor is changed, and wherein the sound pressure level detected by the sound pressure level sensor is a frequency around a resonance inside the tire cavity.

2. The tire air pressure monitoring device according to claim 1, comprising a processing unit which determines whether values of the sound pressure level signals detected by the sound pressure level sensor is changing around a preset threshold value corresponding to the resonance inside the tire cavity and enables the transmitter to send the signals only when the values are determined to be changing.

3. The tire air pressure monitoring device according to claim 1, comprising a power source of a battery for activation of the tire air pressure monitoring device.

4. The tire air pressure monitoring device according to claim 1, wherein the physical quantity is one of air pressure and temperature inside the tire cavity.

5. A pneumatic tire having a tire air pressure monitoring device in a cavity of the tire, the tire air pressure monitoring device having a sensor which detects a physical quantity relating to tire air pressure, and a transmitter which sends signals detected by the sensor, the sensor being a sound pressure level sensor which detects a sound pressure level inside a tire cavity filled with air, the transmitter being enabled to send the signals only when the sound pressure level detected by the sound pressure level sensor is changed, wherein the sound pressure level detected by the sound pressure level sensor is a frequency around a resonance inside the tire cavity.

6. The pneumatic tire according to claim 5, wherein the tire air pressure monitoring device comprising a processing unit which determines whether values of the sound pressure level signals detected by the sound pressure level sensor is changing around a preset threshold value corresponding to the resonance inside the tire cavity and enables the transmitter to send the signals only when the values are determined to be changing.

7. The pneumatic tire according to claim 5, wherein the tire air pressure monitoring device comprises a power source of a battery for activation thereof.

8. The pneumatic tire according to claim 5, wherein the physical quantity is one of air pressure and temperature inside the tire cavity.

* * * * *